United States Patent [19]

Cardullo

[11] 4,292,052
[45] Sep. 29, 1981

[54] AIR POLLUTION CONTROL DEVICE AND METHOD

[76] Inventor: John J. Cardullo, 707 Alter St., Philadelphia, Pa. 19147

[21] Appl. No.: 149,069

[22] Filed: May 12, 1980

[51] Int. Cl.³ ............................................. B01D 46/10
[52] U.S. Cl. ......................................... 55/19; 55/97; 55/212; 55/270; 55/314; 55/323; 55/344; 55/350; 55/470; 55/472; 55/385 F
[58] Field of Search ...................... 55/18, 97, 210, 212, 55/270, 312, 314, 323, 328, 344, 350, 418, 470, 472, DIG. 37, 385 F, 19

[56] References Cited

U.S. PATENT DOCUMENTS

| | | | |
|---|---|---|---|
| 968,370 | 8/1910 | Lea | 55/350 |
| 1,339,761 | 5/1920 | Hughes et al. | 52/198 |
| 1,480,399 | 1/1924 | Kling et al. | 55/350 |
| 1,600,984 | 9/1926 | Jones | 52/236.2 |
| 1,943,617 | 1/1934 | Miller | 55/344 |
| 2,782,705 | 2/1957 | Breidert | 98/55 |
| 3,060,529 | 10/1962 | Clay | 20/62 |
| 3,063,219 | 11/1962 | Copcutt | 55/344 |
| 3,192,689 | 7/1965 | Smith | 55/229 |
| 3,364,838 | 1/1968 | Bradley | 98/33 |
| 3,388,534 | 6/1968 | Jensen | 55/269 |
| 3,545,180 | 12/1970 | Schrag | 55/284 |
| 3,631,655 | 1/1972 | Mullen | 55/344 |
| 3,757,496 | 9/1973 | Berg | 55/293 |
| 3,772,851 | 11/1973 | Duffey | 55/18 |
| 3,864,106 | 2/1975 | Brandt | 55/288 |
| 3,894,853 | 7/1975 | Pike | 55/258 |
| 4,093,436 | 6/1978 | Wenzel | 55/269 |

FOREIGN PATENT DOCUMENTS

| | | |
|---|---|---|
| 8244 | of 1927 | Australia . |
| 515985 | 12/1952 | Belgium . |
| 484701 | 11/1929 | Fed. Rep. of Germany . |
| 898248 | 11/1953 | Fed. Rep. of Germany . |
| 557073 | 11/1943 | United Kingdom . |
| 893329 | 4/1962 | United Kingdom . |

*Primary Examiner*—David L. Lacey
*Attorney, Agent, or Firm*—Seidel, Gonda, Goldhammer & Panitch

[57] ABSTRACT

An apparatus and method for controlling the quality of the air in a specific environment including a base portion having a plurality of air purification means. The base provides support for an upwardly extending central tower having a plurality of air inlet openings which are shielded from the weather by protective covering means. The tower is covered by a roof. On entering the tower, the content of the air is monitored. A fan means creates an air flow path through the air inlet openings, downward through the tower to the air purification means in the base, through any one of the plurality of air purification means before being vented to the outside environment through air outlet openings. The air is monitored again after being filtered to determine the amount of pollutants. If the amount of pollutants in the air is below a predetermined level, the air is vented to the outside environment by retaining an air outlet gating means in its open position so that the purified air can pass to the outside. If the amount of pollutants in the air is above predetermined level, the air outlet gating means is closed and the exhaust means is shut off and the air inlet gating means is closed stopping the air flow and isolating the individual air purification means.

7 Claims, 3 Drawing Figures

AIR POLLUTION CONTROL DEVICE AND METHOD

BACKGROUND OF THE INVENTION

Air filtration devices have been used in industry for a number of years. Their uses have been restricted to eliminating pollutants and/or contaminants in certain specific environments. These environments were usually inside vessels, chambers or smoke stacks where the purpose of such air filtration device was to remove airborne particles or gases before permitting the air to leave the vessel or chamber or vent to the outside. While filtration systems have become very sophisticated for both sealed and vented systems, there has been no movement towards improving the air quality of the environment immediately surrounding the venting of air used in an industrial process.

SUMMARY OF THE INVENTION

The present invention is directed to an apparatus for controlling the quality of the air in environments such as waste disposal plants, chemical refineries, etc. The device comprises a base housing a number of air purification systems and a central tower extending upwardly from and supported by the base. The tower has air inlet openings at predetermined locations with louvers covering each opening to shield the inlet opening from the weather. At the top of the tower, a roof covers the open interior of the tower. The air is monitored on entering the tower to determine its quality and which pollutants and/or contaminants are present. The monitoring is done at this point to be able to turn on an air purification system which is needed and turn off one which is not needed depending on the content of the air.

An air flow is created along a path such that air flows through the air inlet openings downwardly through the tower to the air purification systems in the base. The flow of air continues along a path through any one of the air purification systems wherein the air is cleaned and scrubbed rendering it free of unwanted particulate and gaseous matter before being vented to the outside environment through an air outlet opening associated with each air purification system.

Each air purification system includes an air inlet gate for permitting or terminating the flow of air through the air purification system. A plurality of filters are interposed in each system in the air flow path for removing the unwanted particulate and gaseous matter or any other specific pollutant and/or contaminant. The air is measured by an air quality monitor to determine the level of pollutants and/or contaminants in the air before permitting an exhaust fan to vent the purified air to the outside environment through the air outlet opening. If the air quality does not meet the governmental standards preset in the monitor, the monitor, which includes conventional control means, will automatically close the air outlet gates and shut off the exhaust fan stopping the air flow to the outside environment. The air inlet gates will then be closed isolating the individual air purification system with the still contaminated air therein. The system must be manually checked and the fault triggering the shut down corrected before the system will continue venting purified air to the outside environment.

It is an object of the present invention to filter the air in a specific environment so as to bring the quality of such air into compliance with governmental clean air standards.

It is a further object of the present invention to provide an air purification system which is free-standing and can be used in areas of high pollution to substantially decrease the amount of pollutants in the air.

Other objects will become apparent to the reader hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
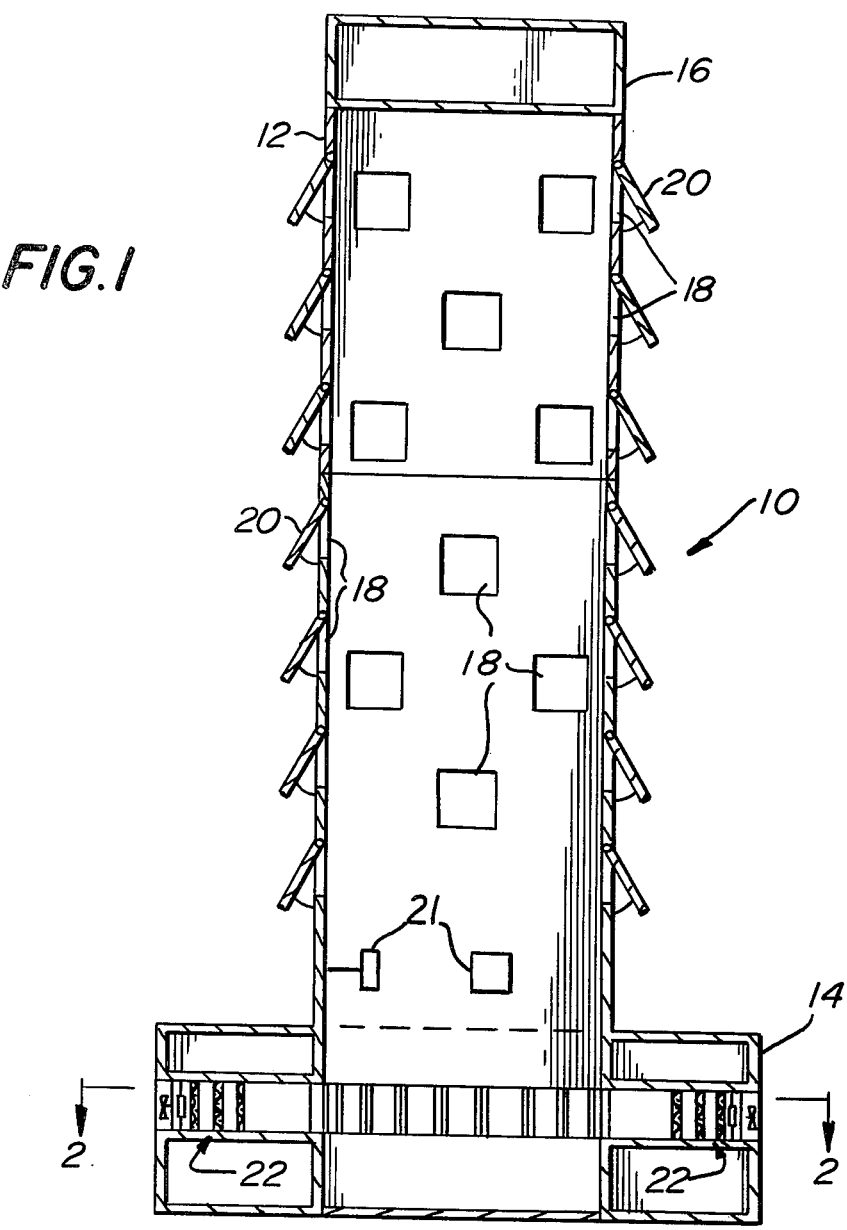
FIG. 1 is a sectional view of the tower and base of the present invention.

Referring to FIG. 1, the air pollution control device of the present invention is generally designated as 10. The tower 12 is centrally located on and supported by base 14. Covering the hollow core of the tower 12 is a roof 16. The tower should extend upwardly to a height that is sufficiently high to be able to capture polluted air from its source before such air escapes into the upper atmosphere. It is presently preferred that the tower 12 be built to a height of 400 feet.

The tower should be constructed so that it is circular in cross-section in order to diminish any wind effect or sway on such tower. The tower can be constructed of any of the various construction materials known in the building art for constructing a tower of the required height. It is important to note that the material and shape of the tower can be varied to accommodate any architectural design in order to blend with the surrounding structures.

The tower 12 is so constructed as to have a plurality of air inlet openings 18 in its exterior walls. These openings 18 should begin at a point no less than 50 feet above ground level and should continue to the top of the tower. The openings 18 can be arranged in any desired fashion. The staggered column openings, can be located as shown in the drawing, are preferred for giving the tower sufficient rigidity while still being capable of taking in sufficient amounts of polluted air. It is preferred that 50 of the air inlet openings 18 are arranged on the exterior wall of the tower 12 as described above. Each of these openings 18 should be at least 12 inches in width by 18 inches in height. Each of the openings 18 will be covered by a louver 20 for protection from the weather. The louvers 20 may be either fixed or movable. If movable, the louvers 20 should be capable of being opened and closed to provide a greater, a lesser or no flow of air through the air inlet openings 18.

The air to be cleaned will enter through the louvered air inlet openings 18 where such air will be metered and tested by an air quality monitor 21 to determine its content of pollutants and/or contaminants. The air quality monitor 21 is a device known per se to those skilled in the art. The air will then be drawn downward by the lower air pressure in the central portion of the base created by the venting of the cleaned air to the outside environment.

Figure 2:
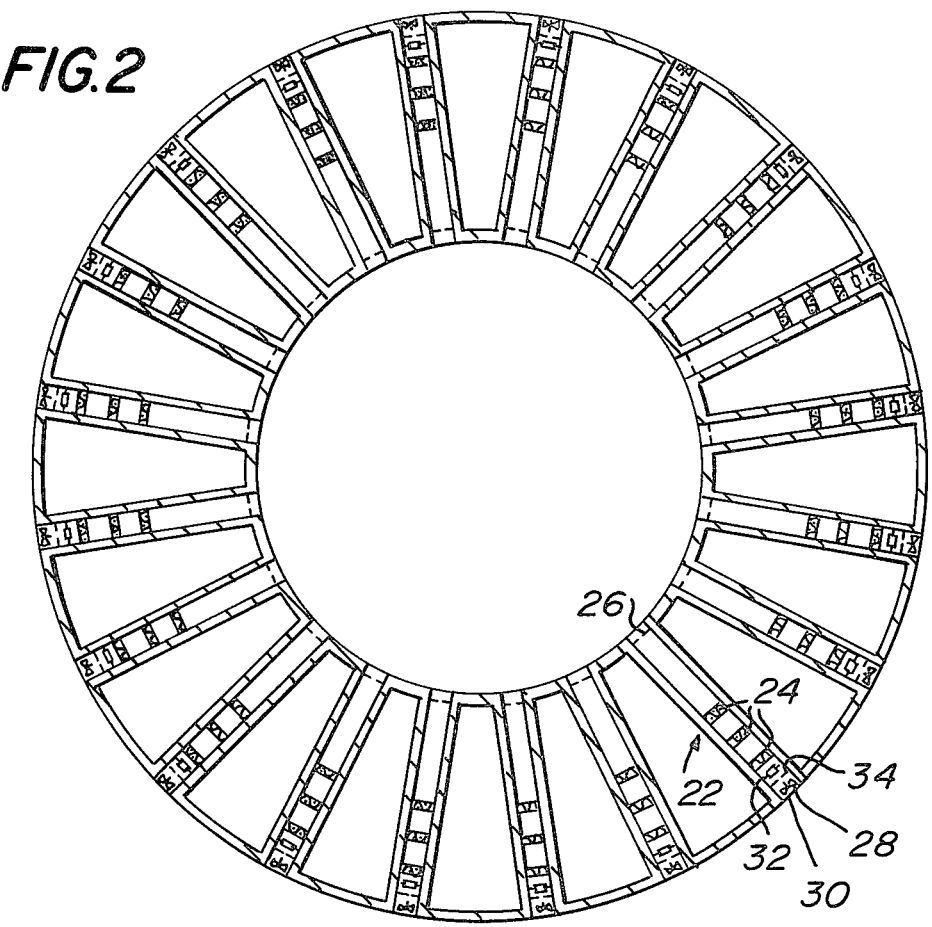
FIG. 2 is a top plan view of the base showing the arrangement of the air purification systems.

The base 14 provides support for the tower 12 and houses each of the air purification systems 22. The base 14, similarly to the tower 12, can be of any size, shape and building material which is compatible with the space available and the surrounding structures. It is preferred that the base be circular in design with an overall diameter of at least 100 feet. The base 14, as can be seen in FIG. 2, houses 20 separate and distinct air purification systems. The exact number of air purification systems used is used by way of example and not by way of limitation. Both a fewer number or a greater number of air purification systems may be used.

Each of the air purification systems 22 is designed to function independently of every other such system. However, each system 22 carries out the same general function as every other such system. It should be pointed out that, although filters are referred to in the embodiment described herein, any suitable means for purifying the air, such as scrubbers, may be used instead.

Figure 3:
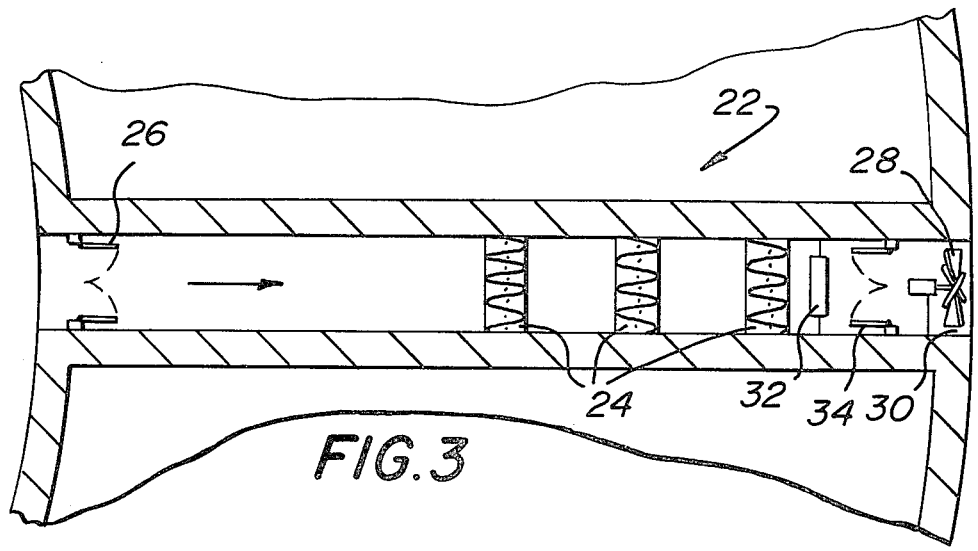
FIG. 3 is a top plan view of a single air purification system.

Referring to FIG. 3, each air purification system 22 will have a passage leading from the base of the tower to the air filters 24. This passage may be of any known construction, e.g., sheet metal, brick, etc., and is preferred to be 5 feet in diameter. At the opening of the passage from the base of the tower, a gating mechanism 26 controlled by monitor 32 controls the flow of air into the air purification system 22. When the gating mechanism 26 is closed, no air will flow into the system. When an individual air purification system 22 is in operation, the gating mechanism 26 will be opened to permit the flow of air through the system. The capability of being able to close down any individual air purification system 22 in order to perform routine maintenance allows the remainder of the systems to continue to function uninterrupted. While the present invention was designed to permit each of the air purification systems 22 to work contemporaneously, it is not anticipated that such operation will be necessary.

Filters 24 are interposed in the air flow path within the passage of the air purification system 22 in order to remove specific pollutants and/or contaminants from the air as it passes through each filter 24. Each of the filters 24 can be so designed and/or manufactured to remove any particulate or gaseous matter which is desired to be removed from the air in order to be in compliance with governmental clean air standards.

As the air passes through each of the air purification systems 22, it is rechecked for particulate and gaseous matter by a second air quality monitoring system 32, which includes suitable conventional control means. Only after the filtered air is in compliance with governmental clean air standards will it be vented back into the outside environment. This is accomplished by a passage of similar construction to the one described above. Mounted in this passage immediately adjacent the final filter 24 is the second air quality monitor 32 which is known per se to those skilled in the art. As the air flows further, it passes through a second gating mechanism 34 to an exhaust fan 28 which forces the purified air out through the air outlet opening 30. The exhaust fan 28 is sufficient to cause a down draft of air in the tower 12 so as to cause polluted air to be drawn in through the air inlet openings 18. If the air quality as measured by monitor 32 does not meet the governmental standards preset in the monitors, the monitor 32 will automatically close the air outlet gating mechanism 34 and shut off the exhaust fan 28. In shutting off the fan 28 and closing the air outlet gates 34, the air flow to the outside environment is stopped. The air inlet gates 26 will then be closed isolating the individual purification system with the still contaminated air therein. Although the individual air purification system has been automatically shut down, it must be manually checked for the cause of the shut down. After such cause has been determined, the system can be reactivated. One such cause of system shut down is the filters becoming clogged by pollutants. After correction of the fault and if standards which have been preset in the monitor 32 are met, the air can again be vented to the outside environment.

The air purification system which was shut down should be returned to service by manually reactivating the system. As the system recycles, the air outlet gates 34 are opened and the exhaust fan 28 is started. Simultaneously with the starting of the fan 28, the air inlet gates 26 are reopened creating an outward air flow, thus returning the system to operation.

It should be noted that each of the filters 24 can be either screens and/or baffles of the type generally known and used to remove particulate matter from the air. The filters 24 may also be of the type generally known and used that contain, e.g., charcoal, zeolite compounds, etc., as gas adsorbant materials for use with such screens or baffles. These types of filter constructions and filtering materials are used by way of example and not by way of limitation.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for controlling air quality comprising:
   (a) a base,
   (b) an upwardly extending covered tower supported on said base having a plurality of air inlet openings, said openings being shielded from the weather by covering means,
   (c) first means for monitoring the quality of air entering the tower through said air inlet openings,
   (d) a plurality of air purification means located in said base to produce purified air, each of said air purification means having an air inlet in flow communication with said tower,
   (e) each of said air purification means including an air outlet opening and located in said base for venting said purified air to the atmosphere,
   (f) second means positioned and arranged with respect to each air purificaton means for monitoring the quality of said purified air before venting to the atmosphere through said air outlet openings,
   (g) air moving means positioned and arranged with respect to each air purification means controlled by said second monitoring means and for creating a flow of air along a path from said air inlet openings downward through said tower and at least one of said air purification means and its associated air outlet opening,
   (h) first gating means positioned and arranged with respect to each air purification means controlled by said second monitoring means and for controlling the flow of air into said air purification means, and (i) second gating means positioned and arranged with respect to each air purification means controlled by said second monitoring means and for controlling the flow of air to the atmosphere through said outlet openings.

2. Apparatus as in claim 1 wherein said covering means are movable louvers.

3. Apparatus as in claim 1 wherein each of said air purification means includes a plurality of filtering means.

4. Apparatus as in claim 3 wherein said filtering means includes screens and baffles to remove particulate matter from the air.

5. Apparatus as in claim 3 wherein said filtering means include gas adsorbent materials to remove gaseous pollutants from the air.

6. Apparatus as in claim 1 wherein said air moving means is a fan located in said base within said air purification means adjacent each of said air outlet openings.

7. A method for controlling air quality comprising the steps of:
 (a) creating a downward flow of air containing pollutants along a path through air inlet openings in a tower supported on a base through at least one of a plurality of air purification means in said base to the atmosphere through air outlet openings in said base positioned and arranged with respect to each air purification means;
 (b) monitoring the quality of air flowing into said inlet openings by detecting the amount of pollutants contained in the air entering said tower;
 (c) controlling the flow of air through at least one of said air purification means by an air inlet gating means;
 (d) monitoring the quality of the air exiting said air purification means to determine the amount of pollutants remaining in the air;
 (e) permitting the continued flow of purified air to the atmosphere when the amount of pollutants in the air exiting said air purification means is below a predetermined level; and
 (f) terminating the flow of purified air through said outlet openings when the amount of pollutants in the air exiting said air purification means is above a predetermined level.

* * * * *